H. T. NEWBIGIN.
MULTICOLLAR THRUST BEARING.
APPLICATION FILED AUG. 8, 1917.
1,289,879.
Patented Dec. 31, 1918.
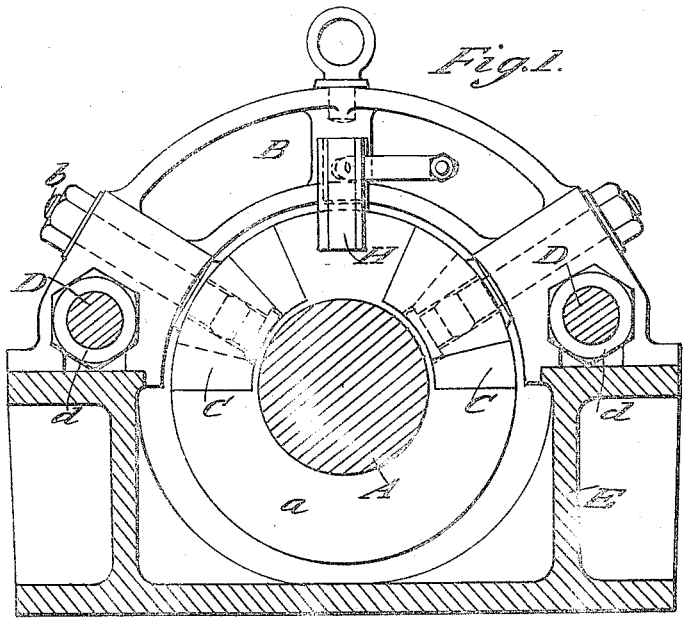
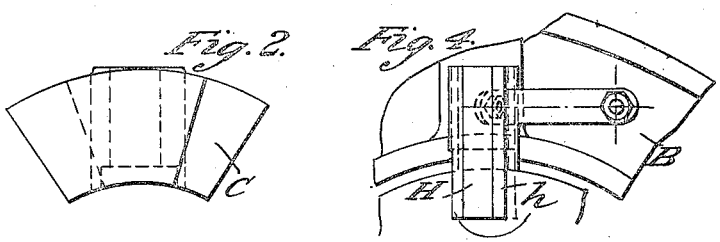
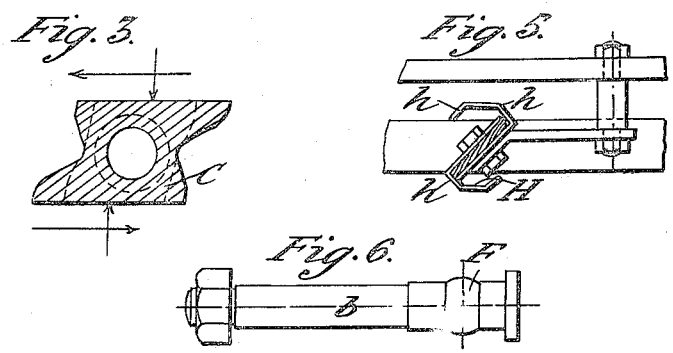
Witnesses:
Inventor
Henry T. Newbigin

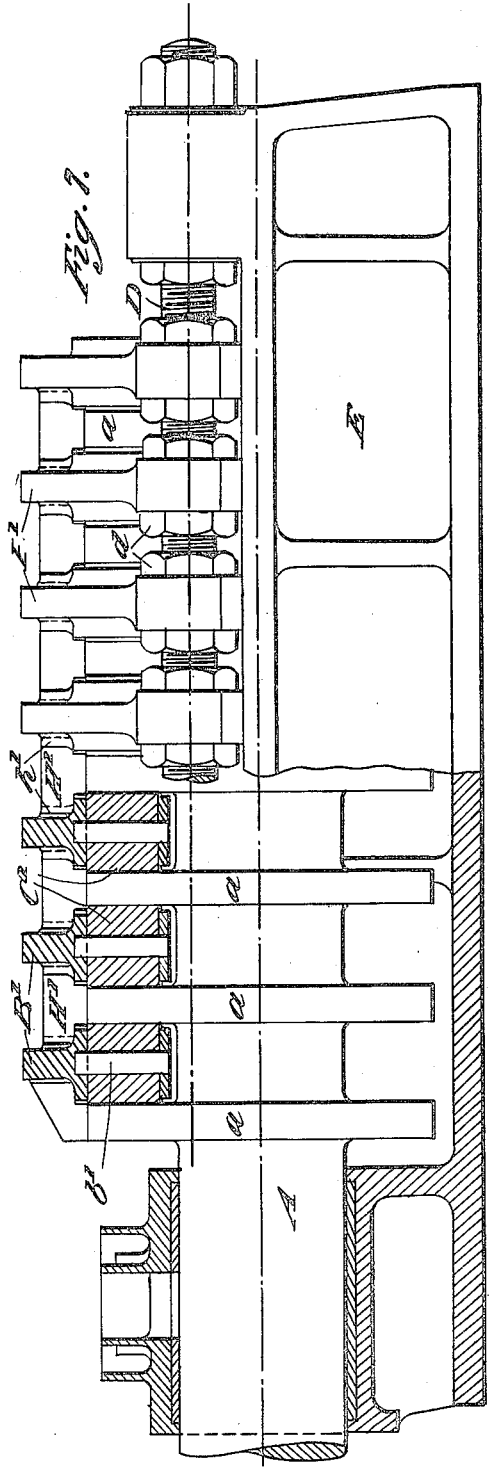
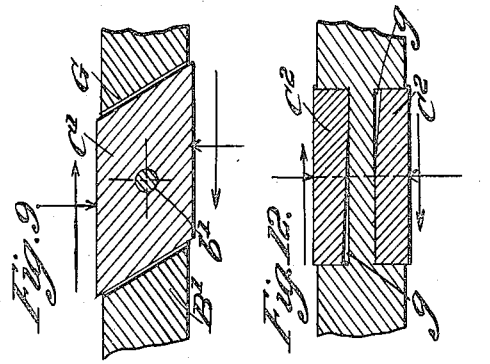
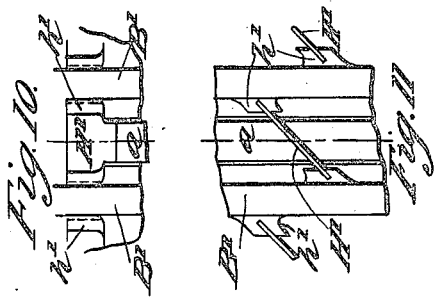
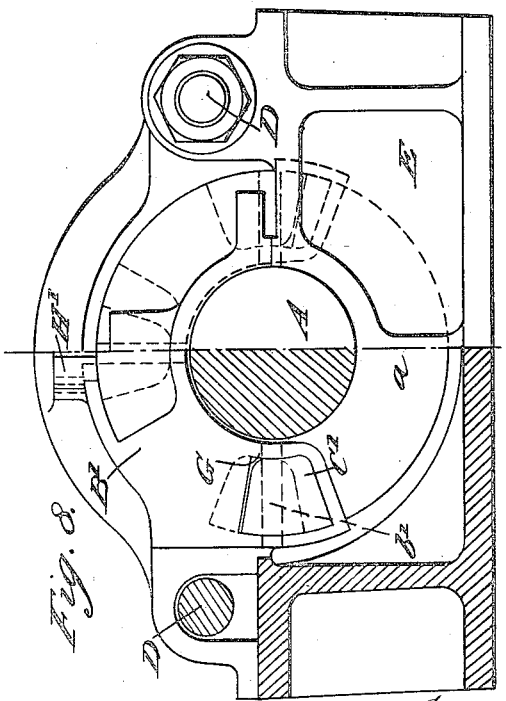

UNITED STATES PATENT OFFICE.

HENRY T. NEWBIGIN, OF NEWCASTLE-UPON-TYNE, ENGLAND.

MULTICOLLAR THRUST-BEARING.

1,289,879.

Specification of Letters Patent.

Patented Dec. 31, 1918.

Application filed August 8, 1917. Serial No. 185,151.

*To all whom it may concern:*

Be it known that I, HENRY THORNTON NEWBIGIN, a subject of the King of Great Britain, residing in Newcastle-upon-Tyne, England, have invented certain new and useful Improvements in Multicollar Thrust-Bearings, of which the following is a specification.

In the design of an ordinary multi-collar thrust bearing the problem the designer has to solve is governed by the efficiency of this form of bearing. He has given a shaft of a certain diameter revolving at a certain speed, and which has to withstand a certain thrust. The resistance to turning will be about 0.03 of that thrust, and the greatest load that the bearing surfaces will carry with safety is about 50 lbs. per square inch.

In order to bring the pressure down to this figure, he may either use a few collars of large diameter or a number of collars of small diameter. If he does the former, he increases the radius at which the friction acts, and so the power absorbed and the heat generated, and if he does the latter it becomes increasingly difficult to maintain an equal distribution of the load among the collars, especially under the variations of expansion due to the heat generated when the bearing is at work. Furthermore, whatever compromise he makes, there comes a point beyond which the size, load and speed cannot be increased because, owing to the high coefficient of friction, the heat is generated more quickly than it can be dissipated by radiation and conduction, even with the aid of water cooling.

Now, it has been found with the well-known Michell thrust bearing, which is designed from the point of view of the action of the lubricant in automatically generating a pressure oil film between the surfaces, that there is a very much lower coefficient of friction than that stated above and that the bearing surfaces can safely carry a very much higher pressure per square inch. The Michell bearing has a coefficient of friction of 0.0015 as against 0.03 of the old form and carries 200–300 lbs. per square inch with a much greater factor of safety than the primitive form has at 50 lbs.

The present invention relates to marine or double acting multi-collar thrust bearings and is designed to provide a bearing of this type which shall have the advantages of the small friction and high thrust of the Michell bearing and also provide a construction which will permit of the ready conversion of the old type of bearing to the Michell type.

It consists essentially of the combination with a shaft having a plurality of double acting thrust collars of a single series of pivoted stator members or blocks formed and introduced between each pair of collars in such a way that each pivoted stator member or block is capable of taking up thrust in either direction, the said members or blocks being carried by the supporting member or body of the thrust block in any suitable manner.

The invention will be described with reference to the accompanying drawings.

Figure 1 is a transverse section through a multi-collar thrust bearing constructed according to the invention.

Figs. 2, 3, 4, 5 and 6 are detail views of same.

Fig. 7 is a side view partly in section of a modified construction of bearing.

Fig. 8 is an end view partly in section of same.

Figs. 9, 10, and 11 are details of same.

Fig. 12 is a view similar to Fig. 9 showing another modified construction.

In the form of the invention shown in Fig. 1, in place of the usual horseshoe thrust member interposed between the collars a of the shaft A, I arrange over each space between the collars a supporting arch or carrying member B provided with downwardly extending spindles or pivots b upon which are pivoted one or more stator thrust members or blocks C adapted to enter between the collars a above or at the sides of the shaft A, so that they take a position more or less corresponding to that of the old type of horseshoe.

These stator members or blocks C are of such a width or thickness that they fill the space between the collars a similarly to the old type horseshoes and are adapted to take the thrust of the shaft A on either side according to the direction of rotation of the shaft. The stator members or blocks C may be pivoted centrally or otherwise and they may if desired be formed as shown (see particularly Figs. 2 and 3) of such a shape that the pivot although arranged more or less in the center of the stator member or block as a whole, yet comes somewhat behind the center of each bearing surface in the direction in which the collar $a$ is rotating when such surface is taking the thrust.

The pivots $b$ may be of any suitable construction. They may for instance be straight rods with flanged ends to hold the stator members or blocks C in position, suitable means being provided to hold them in the carrying members B, but I prefer to employ a pivot such as shown in Fig. 6 having a partially spherical portion F upon which the stator member or block C pivots to permit a certain freedom of movement universally to the block.

As stated above, any suitable number of stator members or blocks C may be employed with each arch or carrying member B between each adjacent pair of collars $a$ on the shaft A, but in view of the reduced friction and high thrust possible with this type of bearing, I find that two or three such pivoted stator members or blocks between each pair of collars $a$ are generally ample to take the thrust. Two are shown in Fig. 1.

Instead of a number of separate arches or carrying members B corresponding to the number of spaces between the collars on the shaft A as shown, the bearing blocks may be mounted in any suitable form of supporting member in such a manner that they may be capable of adjustment.

I prefer, however, to use separate carrying members B for each series of pivoted stator members or blocks as this provides a simpler and more ready method of adjusting them in position. Such separate carrying members B may as shown be carried and adjusted on two side screws D carried by the supporting member or body E of the bearing in the well-known manner applied to the present type of horseshoe blocks, the adjustment being made by means of adjusting nuts $d$ mounted on the screws D. Where the carrying members B are arranged in this manner it is preferable to arrange the bearing stator members or blocks C as shown in such a manner that a line connecting the centers of the side screws D passes approximately through the center of pressure of the combined surfaces of the blocks in order to obviate any tendency of the top of the arch or carrying member B to bend backward and forward under the thrust.

Any other known means for securing and adjusting the members B may be employed such for instance as lugs on the frame of the bearing and wedges adapted to hold the members B in position with relation to said lugs.

In the arrangement shown in Fig. 7 and Fig. 8, the supporting arch or member B′ for carrying the pivoted stator members or blocks C′ is constructed so as itself to enter the space between adjacent collars $a$ on the shaft A but not so as to engage them, a recess or recesses G (see particularly Fig. 9) being formed therethrough adapted to receive one or more bearing stator members or blocks C′ which are held in position in the supporting arch by pivots $b'$ arranged radially in said recesses.

The stator members or blocks C′ may be of any suitable shape but I prefer a construction as above described in which the pivot while arranged more or less centrally in the block as a whole yet comes behind the center of each bearing surface in the direction in which the collar $a$ of the shaft is rotating when such surface is taking the thrust. They may for instance be of the same shape as is shown in Figs. 2 and 3, or of the somewhat simpler shape shown in Fig. 9.

In the arrangement shown in Fig. 12, which in general construction is similar to that shown in Figs. 7 and 8, instead of making the recesses G right through the supporting arch and employing pivoted stator members or blocks which take the thrust in both directions, separate recesses $g$ may be formed in both sides of the arch adapted to receive stator members or blocks $C^2$ of the ordinary pivoted type, that is to say with bosses or ribs or curved on the back so that they are free within limits to pivot thereon. In this arrangement the thrust in one direction is taken by the stator members or blocks $C^2$ on one side of the arch and that in the other direction by those on the other side.

The body of the bearing is in all cases preferably made so that it forms an oil well in which the collars on the shaft rotate.

Where this is done the oil carried up the sides of the collars provides sufficient lubrication for the stator member or block first presented to the collar, and to lubricate the second or further stator members or blocks scrapers may be employed, adapted to scrape the oil from the periphery of the collars and direct it downward so that it is adapted to enter between the side of the collar and the face of each of the subsequent stator members or blocks.

In Figs. 1, 4 and 5 a scraper H is shown arranged diagonally so that the oil is directed to one or other side of the collar, according to the direction in which the shaft is rotating, so that the faces of the stator members or thrust blocks which are actually taking the thrust are lubricated. The scrapers H are preferably provided at the ends with downwardly extending projections $h$ so as to direct the oil scraped from the periphery of the collar downward on to the face thereof.

In Figs. 7, 8, 10 and 11 another arrangement of scraper is shown. This consists simply of a diagonally arranged plate H′ adapted to be held in slots formed in lugs $h'$ on the carrying members B′, the edge of which plate rests on the periphery of the collar $a$ and scrapes the oil off it to one side or the other according to the direction of rotation of the shaft A.

Having thus described the nature of the said invention and the best means I know of carrying the same into practical effect, I claim:—

1. A double-acting multi-collar thrust bearing comprising, in combination, a bed frame, a shaft having a plurality of double-acting thrust collars, a plurality of series of pivoted stator members or blocks formed and introduced between the collars of the shaft in such a way that each block is capable of taking up thrust in either direction parallel to the axis of the shaft, and means carried by the frame for pivotally supporting the blocks.

2. A double-acting multi-collar thrust bearing as claimed in claim 1 in which the pivoted stator members take the thrust on opposite sides according to the direction of rotation of the shaft.

3. A double-acting multi-collar thrust bearing as claimed in claim 2, in which the pivoted stator thrust members or blocks are pivoted centrally of their mass, and are each so shaped that its pivot comes behind the center of each bearing surface in the direction in which the shaft is rotating when such surface is taking the thrust.

4. A double-acting multi-collar thrust bearing comprising in combination a bed frame, a shaft having a plurality of double-acting thrust collars, a single series of pivoted stator thrust members arranged between each pair of collars of the shaft and capable of taking up thrust in either direction parallel with the axis of the shaft, means mounted on the frame for supporting said thrust members, and means for adjusting the members relatively to the frame.

5. A double-acting multi-collar thrust bearing as claimed in claim 1, in which the means for supporting the pivoted stator thrust members and maintaining them in position between the collars of the shaft consist of a series of arch-shaped members arranged above the shaft upon the bed or frame of the bearing.

6. In a double-acting multi-collar thrust bearing as claimed in claim 5, means for adjusting the supporting arch-shaped members comprising screws arranged longitudinally on either side of the bearing having nuts thereon for adjusting and securing said arches or horse shoes.

7. In a double-acting multi-collar thrust bearing as claimed in claim 5, means for lubricating the faces of the collars taking the thrust, said lubricating means comprising a receptacle in the bed frame to contain oil, in which the collars of the shaft are arranged to rotate, and a plurality of plates carried by the arch-shaped members, said plates arranged each to diagonally engage the periphery of one of the collars to scrape and direct the oil on said periphery to one of the sides of the collar according to the direction of rotation of the shaft.

In testimony whereof I have signed my name to this specification in the presence of two subscribing witnesses.

HENRY T. NEWBIGIN.

Witnesses:
 Thos. Jameson,
 Alex J. Smith.